Figure 1:
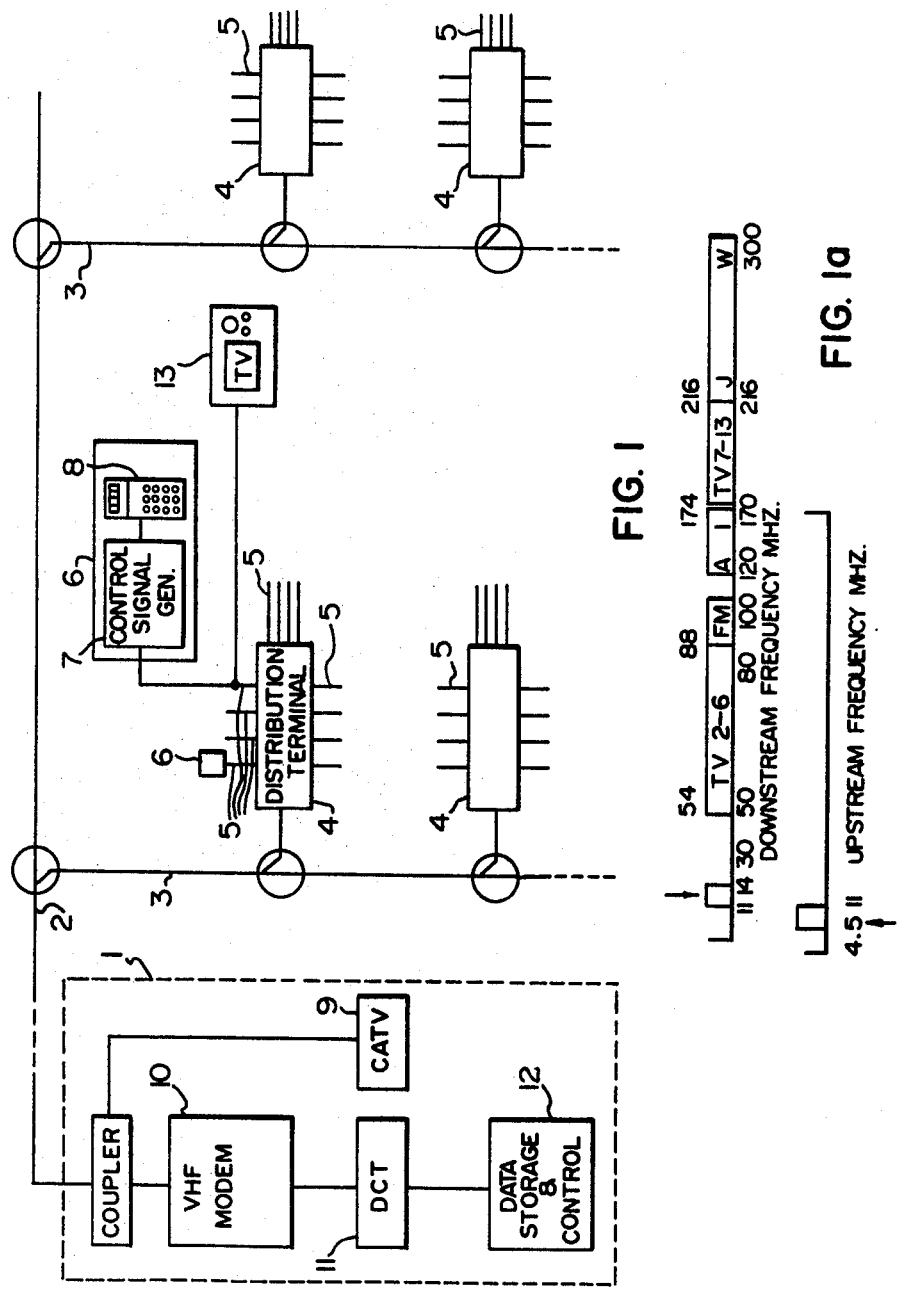

United States Patent [19]

Boland et al.

[11] Patent Number: 4,484,218

[45] Date of Patent: Nov. 20, 1984

[54] VIDEO DISTRIBUTION CONTROL SYSTEM

[75] Inventors: Peter Boland, Nepean; John Coyne, Winnipeg; Irving Gimple, Montreal, all of Canada

[73] Assignee: The Manitoba Telephone System, Winnipeg, Canada

[21] Appl. No.: 258,560

[22] Filed: Apr. 29, 1981
(Under 37 CFR 1.47)

[30] Foreign Application Priority Data

Apr. 30, 1980 [CA] Canada .................................. 350914

[51] Int. Cl.[3] .............................................. H04N 7/18
[52] U.S. Cl. ........................................ 358/86; 455/4;
455/137; 455/139; 455/141; 455/151; 455/183;
455/186; 455/189; 455/209
[58] Field of Search .................... 358/86; 455/4, 3, 5,
455/6, 2, 137, 139, 141, 151, 182, 183, 184, 186,
189, 209

[56] References Cited

U.S. PATENT DOCUMENTS

| 4,077,006 | 2/1978 | Nicholson | 358/86 |
| 4,099,123 | 7/1978 | Finlay | 358/86 |
| 4,135,157 | 1/1979 | den Toonder | 358/86 |
| 4,191,966 | 3/1980 | Ovnick | 358/86 |
| 4,280,140 | 7/1981 | Skerlos | 455/186 |
| 4,302,771 | 11/1981 | Gargini | 358/86 |
| 4,303,960 | 12/1981 | Sherwood | 358/86 |
| 4,343,042 | 8/1982 | Schrock | 358/86 |

Primary Examiner—Howard W. Britton
Attorney, Agent, or Firm—Stanley G. Ade

[57] ABSTRACT

A subscriber distribution terminal is connected to the transmission medium for serving a group of subscribers. Within the distribution control terminal is located a plurality of television converters. A local oscillator in each of the converters is controlled by a microprocessor, which establishes the channel selected from the multi-channel television signal received from the transmission medium. The output of each converter is connected to a subscriber drop which is connected to the subscribers television set.

9 Claims, 8 Drawing Figures

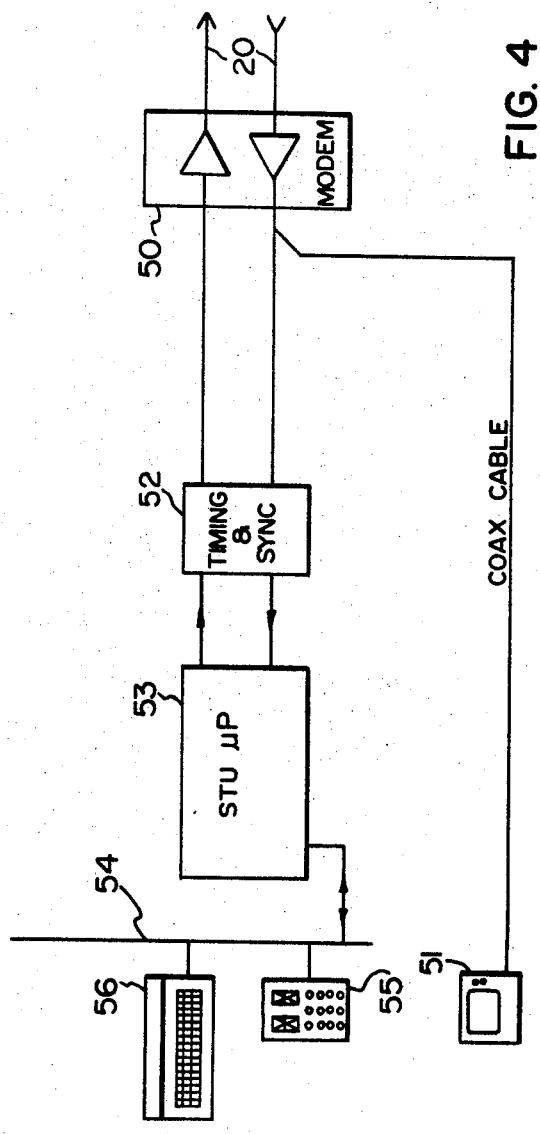
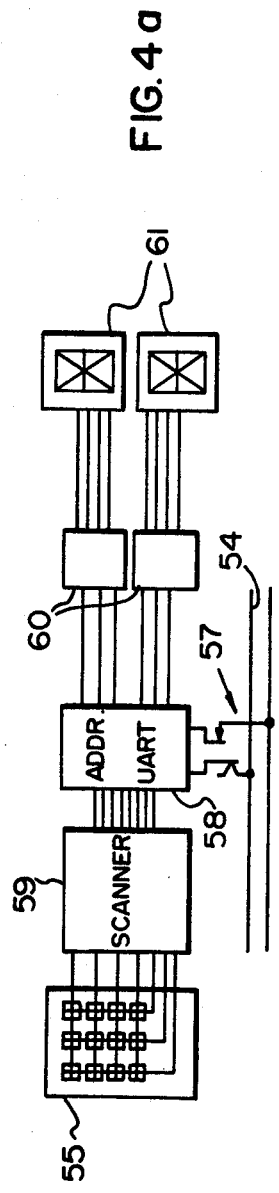
FIG. 4
FIG. 4a

VIDEO DISTRIBUTION CONTROL SYSTEM

This invention relates to a system for controlling the distribution of television signals in a CATV type distribution system.

Television distribution systems normally are comprised of a head end for providing television signals, a tree type transmission medium usually in the form of a coaxial cable main link having off-shoot feeders, to which distribution splitters are connected, groups of subscriber drops being connected to each of the distribution splitters. Subscribers' television sets connected to the subscribers drops. In the past, such distribution systems have been one-way, that is, with the head end gathering television signals for distribution, and transmitting the television signals on the received or substitute television channels via the transmission medium to the subscribers' sets. In recent years, in anticipation of the offering of additional types of services, the distribution system has in some cases been provided as a two-way link.

The transmission medium has been extensively wired as coaxial cable. With the cable transmission bandwidth typically feasible up to about 300 MHz, as many as 35 or more television channels have been able to be accommodated. A standard television set traditionally incorporates a VHF tuner able to accommodate 12 channels, and an UHF tuner theoretically capable of receiving an additional 70 channels. However the CATV system typically can transmit UHF frequencies only with considerable degredation, and consequently UHF television channels are normally down-converted to a mid-band frequency either between channels 6 and 7 or above channel 13, all of which are at VHF frequencies, for transmission via the cable.

To receive these mid-band and super-band frequencies, a special converter must be used to interface between the transmission medium and the television set, which converts all received frequencies to a single channel, typically channel 2 or 3, although some up-convert to the UHF band. The converter is usually connected to the television set externally; some sets have them built in at the factory.

With the offering of additional television services such as pay TV, videotext, etc., there has been little control over the converter connected to the subscriber's television set. As a result the ability to easily detect theft of service is limited. Termination of service is costly since a technician must physically travel to the distribution splitter box, locate the particular subscriber drop to be terminated, and physically disconnect it. Furthermore, the major portion of the provision of service to the subscriber is under his own control, if all of the channels are provided to all subscribers. Even the provision of scrambled television channels is somewhat under control of the subscriber since the decoder box is physically located in his home and is susceptible to tampering.

In the present invention, the channel converters are placed under direct control of the cable system operator. The converters are removed from the subscriber's home, and only the particular channel selected by the subscriber passes via the subscriber's drop to the subscriber's television set.

Further, classes of service can be established, whereby if a subscriber requests a type of service to which he is not entitled, it is not provided to him. Service can be terminated under signal control at the will of the system operator, and can be extended when desired. The system is also capable of providing to the system operator an indication of what channel has been selected, facilitating billing for particular service, obtaining accurate usage data, etc. Further, the present system allows the subscriber to communicate directly to the system head end, facilitating interactive video, request for service such as viewdata type services, pay T.V. channels, playing of games, facilitating home computer services, etc. Further, since the converter is not at the subscribers home, it is not susceptible to tampering, theft or damage by the subscriber. The system also provides for transmission of special channels to users who have contracted for such service.

In the present invention, a subscriber distribution terminal is connected to the transmission medium for serving a group of subscribers. Within the distribution control terminal is located a plurality of television converters. A local oscillator in each of the converters is controlled by a microprocessor, which establishes the channel selected from the multi-channel television signal received from the transmission medium. The output of each converter is connected to a subscriber drop which is connected to the subscribers television set.

Each subscriber has a control signal generator, preferably in the form of a hand-held pushbutton control box having a digital read-out, and upon pressing channel selection buttons, a control signal is generated which is processed by his terminal, is passed up the subscribers drop to the distribution terminal microprocessor. The microprocessor, receiving the signal, causes the channel to be changed by controlling the local oscillator frequency of the associated converter.

The subscriber's local terminal is also connected to the transmission medium and receives, when polled, signals from the head end which are stored in its memory. These signals provide data for a look-up table stored in the microprocessor memory which either enables or inhibits control of the converter upon reception of a request for service or channel change signal from the subscriber terminal. Further, the head end signals can poll the local terminal which itself can store information as to which channels have been selected by the subscriber. Further, it can store request for service signals provided by the subscriber control signal generator which must be provided from the head end, such as video data information, etc.

In particular, the television remote control system is comprised a VHF transmission medium, a central control system including a television signal head end, a digital control for receiving and transmitting digital control signals from the central control system to the transmission medium, and a modem for coupling the television head end and digital control to the transmission line. At least one subscriber distribution terminal is connected to the transmission medium which includes a plurality of television converters for receiving a plurality of television channels from the transmission medium and for outputting one of the channels, a first control for controlling the channel output from each of the converters, a plurality of subscriber drops, and means for receiving television request signals from each of the subscriber drops. The subscriber distribution terminal also includes means for applying the signals to the first control for controlling the channel output in response to the reception of the request signals, and second control means for applying the digital control signals to the transmission medium. At least one subscriber terminal is connected to a corresponding one of the subscriber drops comprising a television terminal connected to the subscriber drop, control signal generating means for generating the television channel request signals, and means for coupling the television channel request signals to the one subscriber drop. Accordingly upon generating a television channel request signal at the subscriber terminal, the converter is caused to apply one of the television signals to the one subscriber drop, under control of the first control means.

More generally, the invention is a television remote control system comprising a transmission medium for carrying a plurality of television channels, at least one subscriber distribution terminal connected to the transmission medium for receiving the channels, including a plurality of subscriber drops, a plurality of converters, each adapted to apply a selected channel to a corresponding subscriber drop, and means for controlling each of the converters, and at least one subscriber terminal connected to a corresponding subscriber drop, including control signal generating means for generating and applying a television service request signal to the subscriber drop for controlling the selection of the channel applied by a corresponding converter to the subscriber drop, and means for connecting a television terminal to the subscriber drop.

In another embodiment, the inventive television remote control system is comprised of means for receiving a television signal over a transmission medium from a head end, a subscriber drop, control means for controlling switching of the television signal to the subscriber drop including means for storing an access control signal, means for receiving a television request signal from the subscriber drop for causing the control means to switch the television signal to the subscriber drop in the event of the access control signal being of first predetermined form and for causing the control means to inhibit the switching of the television signal to the subscriber drop in the event of the access control signal being of second predetermined form.

According to a further embodiment, the invention is a television remote control system comprising a bus for receiving a television signal comprising a plurality of channels, a first plurality of converters, each having its input connected to the bus, a plurality of subscriber drops, each connected to the output of a corresponding converter, each converter being adapted to respond to a control signal received over the corresponding subscriber drop, each converter comprising a variable frequency local oscillator adapted to provide a signal having a frequency determined by the control signal. A mixer is utilized for receiving the television signal and the signal from the local oscillator and for outputting an intermediate frequency signal, a second mixer for receiving the intermediate frequency signal and a second local oscillator signal. A second oscillator is adapted to output a predetermined fixed frequency signal connected to the second mixer in a plurality of the converters.

This invention being a system, it is assumed that a person skilled in the art is fully familiar with digital transmission systems such as one using the DS-1 format, including parallel and serial bit transmission, microprocessor and computer systems, polling techniques and the like.

It is preferred that the digital transmission system utilized in the present invention should use the DS-1 protocol, although this is not mandatory. In this type, as is well known, data signals are transmitted typically at 1.544 megabits per second. The bits are divided into 8,000 frames each made up of 192 data bits and 1 frame bit, 8,000 frames being transmitted in each second. Each frame is made up into 24 time slots each being 8 bits long. Thus each time slot forms a 64 kilobit per second channel. Since the frame bits are usually themselves grouped into groups of 12 bits which form special signalling channels, the actual resultant speed of transmission is usually above 56 kilobits per second for each channel. Data is preferred to be transmitted in each channel in packets, by which the various terminals identify themselves, transmit data, including error checking bits, etc. Each time slot containing 8 bits is usually numbered from a frame bit, i.e., channel 1, channel 2, etc. It is also preferred that the downstream data bits should be modulated on a carrier, such as 12 mhz, and the upstream data bits should be modulated on a carrier such as 6 mHz.

Structures and methods for polling stations, transmitting data in various time slots, and receiving it from those time slots, and applying the data to a digital translation means such as a computer is well known and therefore an explanation thereof in detail is believed to be redundant.

Figure 2:
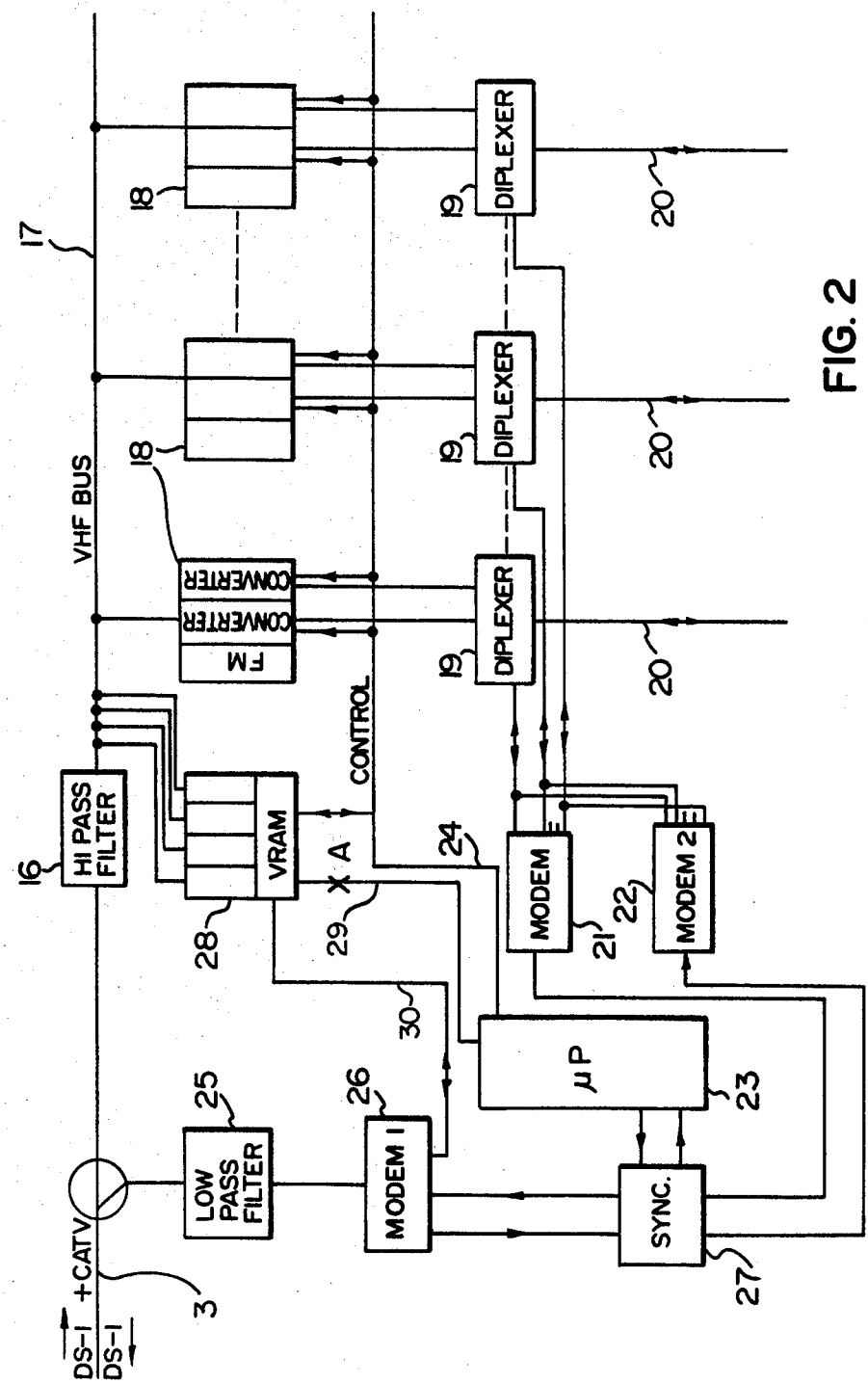
Figure 3:
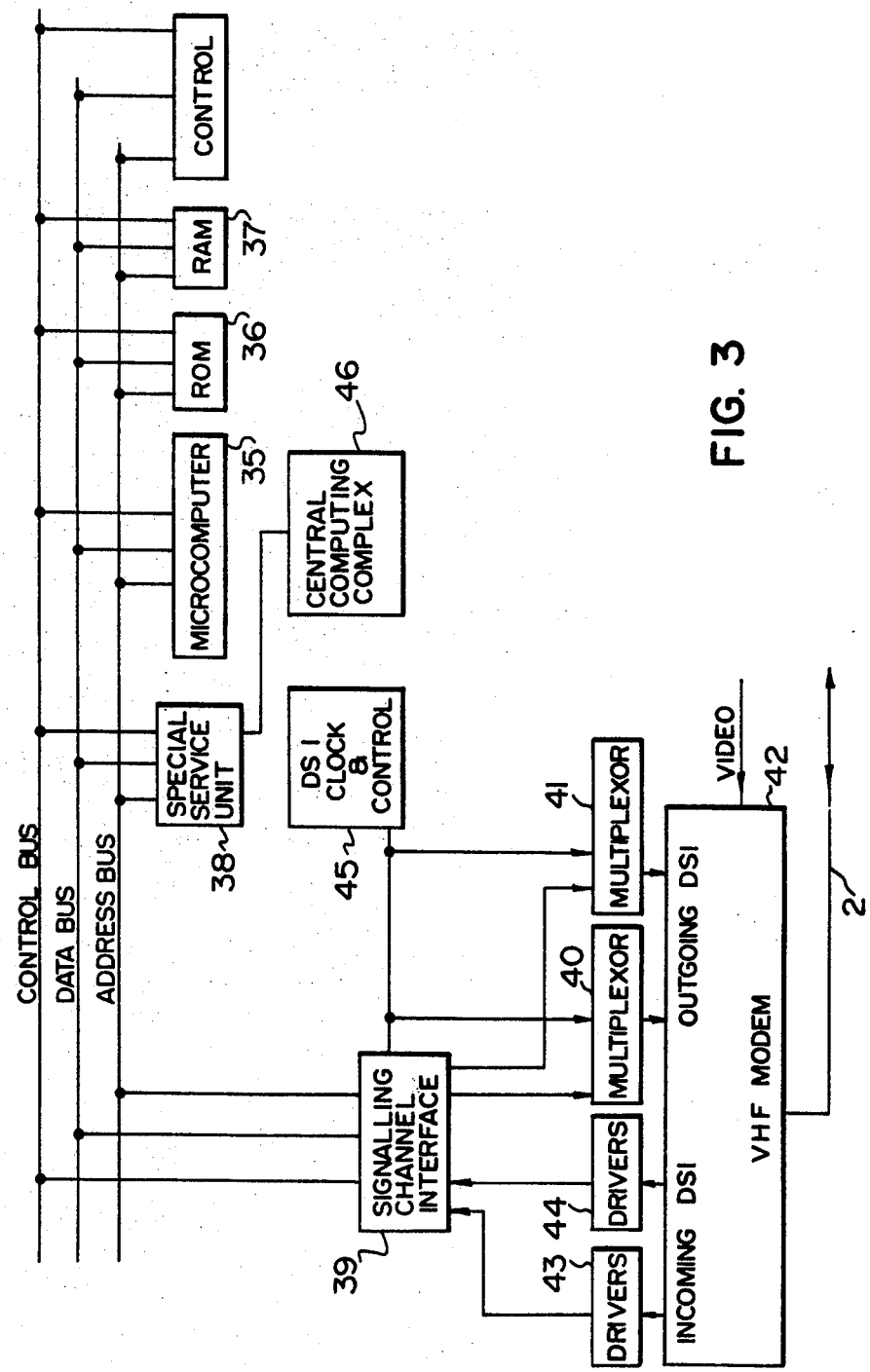
Figure 5:
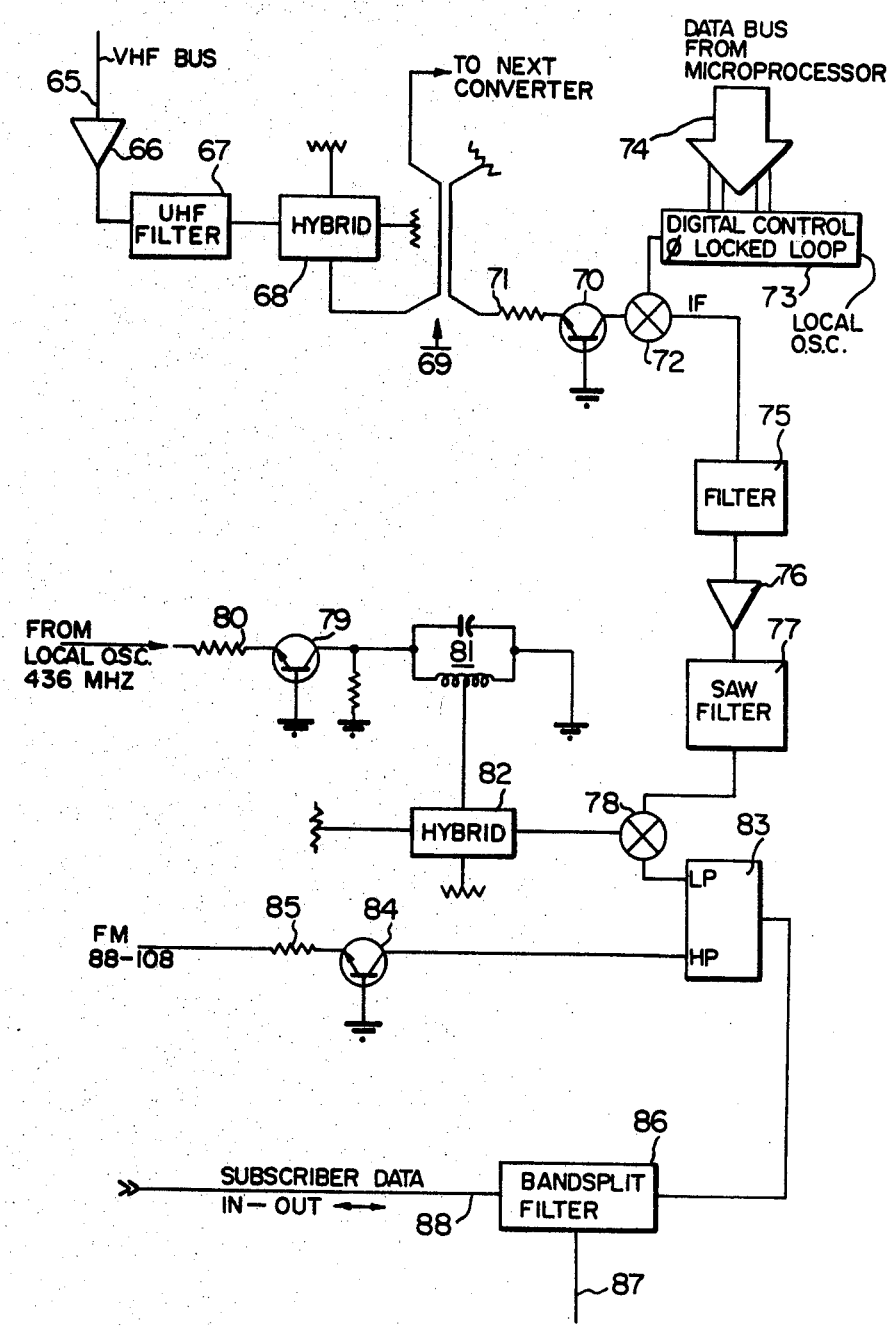
Figure 6:
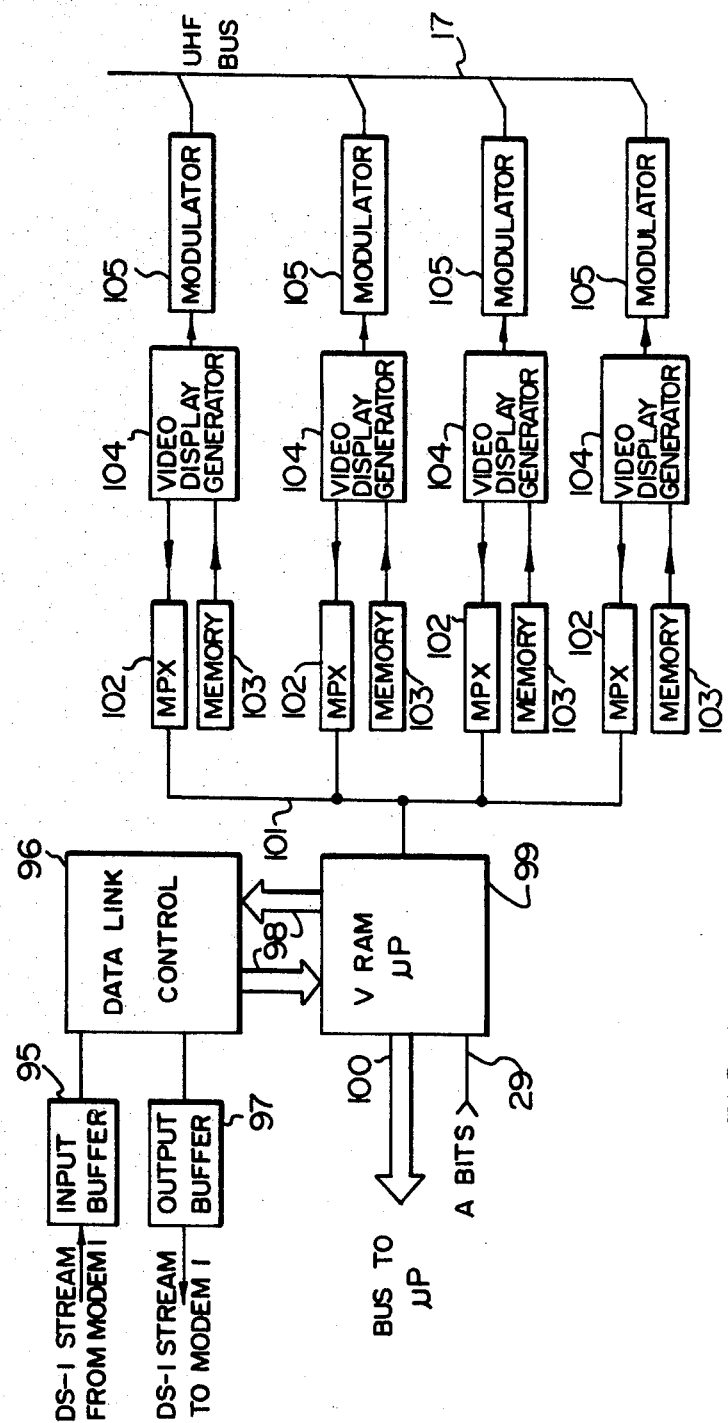

A better understanding of the invention will be obtained by reference to the description below, and to the following drawings, in which:

FIG. 1 is a block diagram of the system,

FIG. 1A is a pictorial diagram of the frequencies preferred to be used in the present invention, FIG. 2 is a block diagram of the subscriber distribution terminal, FIG. 3 is a block diagram of the head end equipment, FIG. 4 is a block diagram of the subscriber terminal, FIG. 4a is a more detailed block diagram of a portion of the subscriber terminal, FIG. 5 is a block diagram of an interactive video module at the subscriber distribution terminal, FIG. 6 is a more detailed block diagram of the converter used in the subscriber distribution terminal.

Turning now to FIG. 1, a block diagram of the system is shown. The system is comprised of a head end 1 connected to a transmission medium 2 which is preferably coaxial cable but can be fibre optic light guide, etc. Branch transmission lines 3 are connected to the transmission medium. To this point, the system is similar to a normal cable T.V. distribution system.

However, rather than having subscriber distribution splitters connected to the branch transmission lines, subscriber distribution terminals 4 of the kind to be described below are connected to the branch transmission lines 3. A plurality of subscriber drops 5, e.g., 12, are connected to the distribution terminal 4. Within the subscribers home, connected to a subscriber drop is a subscriber terminal 6. Each subscriber terminal is comprised of a control signal generator 7 connected to a keypad 8. Also connected to the subscriber drop 5 is a standard television set.

Within the head end 1 a cable T.V. or other video source 9 is connected to a VHF modem 10, which itself is connected to the transmission medium 2. Also connected to the input of VHF modem 10 is a distribution control terminal 11, which is also connected to a data storage and control means 12.

The video signal to be distributed is applied to VHF modem 10 from the video source 9, and is applied as an analog VHF signal to the transmission medium 2 in the normal manner. The video signal passes down stream down the branch transmission line 3 and is received by each of the distribution terminals 4. This is depicted in FIG. 1A, showing for example broadcast television channels 2-6 and the f.m. band transmitted between 50 and 108 megahertz downstream.

At the same time the distribution control terminal 11 applies interrogation signals, polling each distribution terminal in turn, requesting the transmission of stored data representative of requests for service by the subscriber terminals. In response, the polled distribution terminal transmits, in its designated time slot or in a control time slot, signals representative of the requested information. This is passed via the branch transmission lines, the transmission medium and VHF modem 10 through the distribution control terminal 11 to the data storage and control 12.

It is preferred that a DS-1 packetized transmission format should be used. With the T.V. and f.m. signals being passed toward the subscriber distribution terminals at above 50 megahertz, it is preferred that the DS-1 data signals should be modulated on a carrier and be carried between 11 and 14 megahertz: two signals, one being the inverse of the other for error checking (see FIG. 1A). It is also preferred that data signals travelling in the up-stream direction from the distribution terminals to the head end should be within the frequency band 4.5-11 megahertz.

As noted earlier, each of the distribution terminals 4 contains a plurality of microprocessor controlled converters, one converter for each subscriber drop 5, (although more than one can be used for each subscriber drop if a service by which more than one channel at a time is supplied as being requested by the subscriber).

The use of the distribution terminal to reformat and transmit data to the head end, i.e. acting as a buffer, substantially eliminates one of the major problems in such systems, that of noise gathering from the distributed subscriber terminals.

The subscriber, wishing to access a particular television service or channel keys in an access code and and channel selection code into his keypad 8. This causes the control signal generator to generate a data signal. The distribution terminal 4 scans each subscriber drop in sequence, and when it detects a signal from the control signal generator, the microprocessor in the distribution terminal stores a signal indicating a request for service. It then compares the request with a look-up table and determines whether the subscriber drop can be given the requested service. Alternately, the look-up table can be in the subscriber terminal. If the class of service is extended the subscriber, and if it is a converter service required, data is transmitted to the distribution terminal to operate the converter to feed the requested channel to the subscriber drop, where it is received by the T.V. receiver 13 in the subscriber's home. The T.V. receiver is tuned, for example, either to channel 2 or 3 at which the output of the converter is fed. If two converters are used and two channels selected, one T.V. set is tuned to channel 2 and the other to channel 3, or some other predetermined idle channel. Data is also sent to the head end, indicating that a particular channel has been selected. This can be used for billing or polling purposes.

In the event a viewdata or other type of video service has been requested, the microprocessor in the distribution terminal 4 accesses a local video control including a VRAM which outputs on the VHF bus which feeds the converters. Access to the VRAM is of course dependent on whether the local subscriber is empowered to access this service.

Should certain of the data signals input from keypad 8 require the transmission of data signals from the head end, or access of facilities at the head end, the requested information is stored in the distribution terminal 4, and is transmitted to the head end when the distribution terminal is polled.

Turning to FIG. 2, the distribution control terminal is shown in block diagram. The branch transmission line 3 feeds both the video signal and carries two-way DS-1 data signals.

A high pass filter 16 separates the television signals from the data signals, and applies them to a VHF bus 17. The television signals are applied to the inputs of converters 18. In FIG. 2, two converters with an f.m. transmission portion are shown for each converter. The outputs are connected to corresponding diplexers 19. The outputs of each of the diplexers are connected to corresponding two-way subscriber drops 20.

The other input of each of the diplexers is connected to modems 21 and 22. Modems 21 and 22 are respectively connected to data input and output terminals of microprocessor 23 via synchronous circuit 27. A control output of microprocessor 23 is connected to each of the converters 18 via control bus 24.

The DS-1 data signals are passed via lowpass filter 25 and are applied to modem 26. The digital data signals are applied via synchronization circuit 27 to microprocessor 23. Similarly digital data signals from microprocessor 23 are applied via synchronization circuit 27 to modem 26 and are applied via lowpass filter 25 to the transmission line 3.

An interactive video module 28 is also provided, having a plurality of individually accessible sections shown, with their outputs connected to the VHF bus 17. A control input is connected to the control bus, and a data input line 29 is connected to microprocessor 23. In addition, a bidirectional data line 30 is connected to modem 26.

The signal from the branch transmission line 3 should be equalized and split, one portion being applied to high pass filter 16 and one portion to low pass filter 25. Low pass filter 25 also includes a diplexer, which extracts the DS-1 signal and forwards it to modem 26. It also inserts the DS-1 data signal generated at the distribution terminal and inserts it into the transmission line feeder system leading to the head end.

The other portion of the signal is applied through a high pass filter 16 to a VHF bus 17. This signal contains the video and f.m. signals. These signals are split into preferably 24 equal parts, one part to each of the converters (preferably 2 being assigned to each subscriber drop).

Four outputs of the interactive video modules 28 are also applied to the VHF bus. The video module, having four video display units, has 4 r.f. modulators contained therein connected to a VRAM, which outputs a signal on the VHF bus for eventual selection by a subscriber.

Modem 26 is used to convert the DS-1 bit stream received from the head end for input to the control section comprising synchronization circuit 27, microprocessor 23, and ancillary circuitry. Modem 26 also modulates the two DS-1 bit streams received from the control section for transmission to the head end.

Modem 21 is used to combine signals received from the 12 subscriber drops into one DS-1 bit stream for input to the aforenoted control section. Modem 22 also transmits the DS-1 bit stream generated in the control section to the 12 subscriber drops. To assure privacy, the output data to each subscriber is enabled only during a time slot assigned to that subscriber. Modems 21 and 22 are controlled directly by microprocessor 23 via time slot selection bus (not shown).

The control section is comprised of timing and synchronization circuitry 27, microprocessor 23 and an associated memory. Commands are received by this section from the head end over the DS-1 channels and sends information to the head end upon command. It also controls and supervises the 12 subscriber terminals connected to it over the subscriber drops by using, preferably, time slot 1, and controls all internal functions of the distribution terminal such as channel selection and assignment of interactive video module sections.

Microprocessor 23 scans each of the subscriber drops 20 in turn. In most cases it receives idle messages. Upon receiving a request for service via diplexer 19 and modem 21, it checks its internal memory to determine that the service request can be answered. If the request for service is the selection of a new channel, a signal is sent from microprocessor 23 via the control bus to the associated converter, digitally causing a channel selection to be made and the signal sent via diplexer 19 to the subscriber drop 20.

As noted earlier, the DS-1 format consists of frames each having 24 time slots. Each time slot forms an effective 56 kilobit per second channel. Accordingly all 12 subscriber terminals simultaneously send an 8 bit message containing control information on the same time slot, (e.g., time slot 1). The control information might be a T.V. channel change request and number, etc. The microprocessor enables each of the diplexers sequentially (or at any desired random sequence) to scan the incoming 8 bit messages separately.

Any time that a non-idle message is received, it is preferred that it should enable the associated diplexer at least two more times so as to match the three received data message signals, for error checking. Preferably the microprocessor responds to a non-idle message by returning the same message as acknowledgement back to the subscriber terminal. The distribution terminal can thus scan all 12 subscriber terminals within 30 milliseconds (2.5 milliseconds per subscriber terminal).

The data channel to the subscriber unit is divided into a data channel, an "A" low speed signalling channel and a "B" signalling channel. The A and B signalling channels are the least significant bits of each time slot during each alternate twelfth frame. Since one time slot is assigned per subscriber terminal, each subscriber terminal can transmit one "A" bit every twelfth signalling frame for a total capacity of 666 ⅔ bits per second per subscriber terminal.

The A signalling channel is used to transmit signals from a keyboard to the VRAM (to be described later). When the keyboard is turned on, the subscriber terminal sends a message over the control channel (time slot 1) to the distribution terminal informing it of the request. If the VRAM is available, the distribution terminal sends a message in time slot 1 to acknowledge this to the subscriber terminal. The distribution terminal then sets its connection memory to transmit all information on the A channel to the VRAM (via data input line 29). If all VRAMs are busy, the distribution terminals sends a "not available" message to the subscriber terminal on time slot 1.

When a connection between the keyboard at the subscriber terminal and the VRAM at the distribution terminal has been established, the data from the keyboard is sent directly to the VRAM in an asynchronous format. Every time a key is pressed, a 10 bit message is sent to the VRAM. The message should consist of a start bit, 8 bits of data, and a stop bit. The 8 bits of data are made up of 7 ASCII bits (1 character) and an address bit (designating the keyboard).

The VRAM interprets the characters and performs the proper function in a well known manner to display the information on the subscribers television set, or to transmit the information to a data base. This procedure continues until the subscriber turns off his keyboard. When this is done the subscriber terminal sends an 8 bit "off" message to the distribution terminal on time slot 1. The microprocessor 23 then informs the VRAM, resets the connection memory in order to stop transmitting information to the VRAM, and packetizes a message to forward to the head end.

The B channel is not used for operating the converter. The data received from time slot 1 and the A signalling bits of the bit streams coming from the subscriber terminals are acted upon by microprocessor 23.

Turning now to FIG. 3, the basic head end equipment is shown. A microprocessor 35 is connected to a control bus, a data bus, and an address bus. A ROM 36 and a RAM 37 are also connected to the noted buses. A special service unit 38, to be described in more detail below, is connected to the control, data and address buses, as well as a signalling channel interface 39. The output of signalling channel interface 39 is connected via multiplexers 40 and 41 to the outgoing DS-1 stream via VHF modem 42. Transmission medium 2 is connected to the output of modem 42. Drivers 43 and 44 have their inputs connected to the transmission medium 2 via modem 42, and their outputs connected to signalling channel interface 39. A clock and control circuit 45 is connected to signalling channel interface 39 and to multiplexers 40 and 41. A video input to VHF modem 42 provides the VHF video signal referred to earlier for transmission on transmission medium 2. The VHF modem 42 corresponds with modem 10 in FIG. 1 and the remaining elements correspond with distribution control terminal 11 and data storage and control 12 of FIG. 1.

The DS-1 A signalling channel is used to exchange message codes between the distribution terminals and the head end equipment shown in FIG. 3. These message codes include the codes required for control and for special service requests such as video channel request, viewdata request, subscriber polling, etc. Each message should be 24 bits long with an 8 bit field reserved for the code and a 13 bit field reserved for the address. The remaining 3 bits are used for parity check.

The address scheme is preferred to be as follows: 3 bits for an intermediate repeater address (if used), for a maximum of 8 repeaters, 5 bits for the distribution terminal address for a maximum of 32 distribution terminals attached to each repeater-splitter, and 5 bits for the subscriber terminal for a maximum of 12 subscriber terminals per distribution terminal. Each message takes all of the bits reserved for the A signalling channel at each A signalling frame.

The head end polls each distribution terminal in turn at each second signalling frame while the other signalling frames are reserved for the distribution terminal to send its own messages or to relay messages from the micro-computer. The head end expects a response to each poll message and an acknowledge message to each second message.

The signalling channel interface unit receives messages 8 bits at a time in parallel from mini-computer 35 and inserts the messages one bit at time on the outgoing DS-1 bit streams, while stripping the incoming messages from the incoming bit streams to present it 8 bits in parallel at a time to the mini-computer. The signalling channel interface 39 should also include a parity check circuit.

Since mini-computer 35 operates at a completely different clock rate from the DS-1 clock, clock and control circuit 45 is required, which is completely independent of the micro-computer clock. Clock and control circuit 45 generates the DS-1 signal format as described earlier, i.e, 1.544 megabits per second or 8,000 frames per second of 193 bits each. The eighth bit of each time slot on successive 12th frames, interleaved on each 6th frame is used for signalling and forms the A and B signalling channels, each of which is divided into 24 666 bits per second data channels. In addition, the frame bit inserted at the end of each frame follows a pattern that repeats itself each 12 frames, for synchronization, and for identification of the A and B signalling frames.

Upon polling each of the distribution terminals under control of microcomputer 35, the signalling channel interface 39 converts the signal into a DS-1 format based on clock and control circuit 45, applies it to multiplexer 40 (and multiplexer 41 in inverse, if a second, inverted channel is used), and applies it to the input of modem 42 where it is modulated onto the 11-14 megahertz band (8×1.544 megahertz) for transmission to the distribution terminal. A response, indicating a request for a special television service is received via transmission medium 2, is down converted in modem 42 and applied via drivers 43 and 44 to signalling channel interface 39. Here it is applied to the control, data and address buses for reception by microcomputer 35.

Special service unit 38 transfers the system data messages comprising control data such as pay T.V. time of use, etc., to the central computing complex 46, and to transfer data messages from the central computing complex to microcomputer 35.

Turning now to FIG. 4, a basic subscriber terminal is shown. This is comprised of a modem 50 which is connected to the subscriber drop 20. A standard television set 51 is connected to the modem, which includes a high pass filter for transmitting the video signals to television set 51.

Incoming and outgoing data signals are transmitted between timing and synchronization circuits 52 and modem 50. A microprocessor 53 is connected to the timing and synchronization circuit 52, and also has a bidirectional output connected to an asynchronous bus 54. A key pad 55 and a keyboard 56 are connected to asynchronous bus 54.

In FIG. 4A the asynchronous bus 54 is shown which has at least one jack 57 connected thereto. In practice it is preferred that asynchronous bus 54 should run throughout the subscribers home, and can be, for example, the two unused wires of the 4 wire telephone cable normally found.

An addressable UART 58 is plugged into jack 57. Key pad 55 is connected to the input of a keyboard scanner 59, which has its output connected to the input of UART 58.

The output of UART 58 is connected to the input of display drivers 60, which controls the operation of digit displays 61.

Microprocessor 53 sequentially polls all the devices connected to the asynchronous bus. The polling format consists of two messages, each consisting of 11 bits, a start bit, 8 data bits, a parity bit, and a stop bit. Concerning the 8 data bits, the first message is comprised of 7 address bits and a mode bit indicating that this is an address. The second message is comprised of 7 data bits and a mode bit indicating that it is a data message. The data rate is 2.4 kilobits per second.

The UART (universal asynchronous receiver-transmitter) taps the signal transmitted along the bus and if the address corresponds to the address required on the input of the UART, the UART accepts the next message transmitted by the microprocessor 53, and latches the 7 data bits received.

Immediately after the microprocessor transmits its polling message, it switches to the receive mode and waits for an incoming message. The message that is received is from the last device that was polled. This message consists of two words, the first being the address of the device which is transmitting, and the second is comprised of 8 bits of data.

Microprocessor 53 polls key pad 55 ten times per second. This poll consists of the key pad address followed by 7 data bits. The 7 data bits is comprised of two sets of BCD coded bits that give the number of the last television channel selected. When received, these bits are latched and sent in binary coded data to display drivers 60, and thence to digit display 61. The four least significant bits drive the 1's digit display and the 3 remaining bits drive the 10's digit display. The three bits allow digits 0-7 to be displayed, thus allowing the selection and display of up to 80 channels (0-79).

Immediately after the UART receives the poll it transmits a pair of messages. Scanner 59 continuously scans the keyboard 55, latching the last digit key which was pressed. The first message contains the key pad address, and the second is an 8 bit message containing information as to the last key which was pressed. Normally this is the same number as the previous poll. In this case the microprocessor 53 will do nothing. However if the button indicates that a new television channel is requested, the microprocessor sends the information to the distribution terminal over the time slot 1 control channel. When this request is acknowledged by the distribution terminal, the microprocessor 53 transmits the new channel number to the key pad as described above, and the distribution terminal changes the channel converters to the channel selected.

FIG. 5 shows a block diagram of the preferred form of the converter used in the distribution terminal 4. The VHF bus 65 is connected via broadband amplifier 66 to the input of a low pass filter 67, which passes through all signals below 300 megahertz. The output signal is applied via hybrid 68 to a transformer 69. If desired, one of the terminations on hybrid 68 can be connected to a second rank of 12 subscribers, otherwise it is terminated with, for example, 50 ohms.

Transformer 69 is connected to the emitter input of grounded base transistor 70 via resistor 71. The collector output applies the video signals to a mixer 72. A local oscillator 73 has its output also connected to mixer 72. Preferably local oscillator 73 is a digitally controlled phase locked loop, which has its digital selection input connected via a data bus 74 to a microprocessor. The microprocessor referred to is element 23 of FIG. 2, and the data bus 74 is control bus 24 of FIG. 2.

Accordingly upon receiving a channel selection request by means of a data word applied to digitally controlled phase locked loop forming local oscillator 73, a local oscillator signal is mixed with the incoming video signals, producing an intermediate frequency signal.

The intermediate frequency signal is applied through filter 75, which can be a two-pole L-C filter, through amplifier 76, to a very sharp bandpass filter 77 centered on the IF signal frequency. Preferably the bandpass filter 77 is a SAW filter.

In one prototype, the local oscillator provides a digitally synthesized local oscillator signal frequency of between 430 and 680 megahertz, providing an intermediate frequency of 380 megahertz when mixed with the incoming signal.

The output signal of filter 77 is applied to one input of mixer 78.

A further local oscillator (not shown) generates a signal which is applied to all of the converters used in a particular distribution terminal. This signal is applied to the emitter input of a grounded base transistor 79 through resistor 80. This signal is applied to a tank circuit 81, to peak up its amplitude, and a portion thereof is tapped off and applied to an input of hybrid 82. This signal which is at the output of hybrid 82 is connected to the second input of mixer 78, and as a result, the down-converted intermediate frequency is applied to a band stop filter 83. The down-converted signal from mixer 78 passes through the low pass portion of filter 83 to its output.

Alternatively, the SAW filter can be replaced by an LC filter, and the SAW filter inserted in the signal path between mixer 78 and filter 83.

An f.m. signal is applied to the emitter of grounded base transistor 84 via resistor 85. Build out resistors from resistor 85 can carry the f.m. signal to the next converter if desired.

The collector output of transistor 84 is connected to the high pass portion of band stop filter 83, and is carried to the output of the filter.

Where the local oscillator signal applied to transistor 79 is, for example, 436 megahertz, mixed with the 380 megahertz intermediate frequency signal, the resultant output signal from mixer 78 is at television channel 2. This signal, with the f.m. 88–108 megahertz is applied to band split filter 86 to the subscriber drop 87. A data line 88 which carries the DS-1 data signal from, and to modems 21 and 22 (FIG. 2) is also connected to band split filter 86. Accordingly filter 86 forms diplexer 19 shown in FIG. 2.

If a second channel is required, a second converter is utilized, and outputs on a different channel than the first.

FIG. 6 shows in more detail the interactive video module 28 referred to in FIG. 2. A block diagram of a unit at the distribution terminal which is shared between a plurality of subscribers terminals connected thereto is shown. In general, this allows the display of up to 16, 32 character lines on a television screen without modification to a standard television set, although with a suitable design, a 256 point×256 point colour graphics display can be provided.

The structure is comprised of a data link controller, a microprocessor, memory, and a video display generator.

The DS-1 stream from modem 1 (FIG. 2) is connected via input buffer 95 to data link control 96, which is connected via output buffer 97 to the outgoing data stream input to modem 26 (FIG. 2). Data link control 96 is connected via buses 98 to microprocessor 99. Microprocessor 99 is connected via bus 100 to microprocessor 23 of FIG. 2, and to a source of the A channel bits via lead 29 to microprocessor 23.

Microprocessor 99 is connected via bi-directional address and data bus 101 to multiplexers 102. Memories 103 are connected to the output of multiplexers 102, and memories 103 and multiplexers 102 are connected to video display generators 104. The output of video display generators 104 are connected via modulators 105 to the VHF bus 17 (FIG. 2).

In general, memories 103 store the characters which are input from either a viewdata data base at the head end, applied through special service unit 38, or the subscriber terminal. The video display generator 104 generates the composite video signals necessary to display the information on a television screen. Modulator 105 then modulates this composite video information up to an unused television channel and transfers it to the VHF bus. This channel can then be accessed as required by any of the converters in the distribution terminal, assuming that the subscriber is allowed to access it as determined by the look-up table in the main distribution terminal microprocessor.

As the subscriber types in data on his key board 56 (FIG. 4), this is displayed on the bottom of his television screen. When the subscriber wishes to access the data which is requested (the request being displayed on his screen) he presses his carriage return. The microprocessor 99 then formats this message into an HDLC formatted message and transmits this information as a packet of high speed data to the head end, and thence to the video text data base.

The keyboard 56 (FIG. 4) is accessed as described earlier with respect to the key pad 55. Upon scanning from the distribution terminal, the data is applied via input buffer 95 to data link control and data link control 96 transfers the information into display memory 103. Video display generator 104 formats it into composite video as noted earlier, and transmits it via modulator 105 to the VHF bus. This is accessed by the users television screen as described earlier with respect to a broadcast television channel. However when the carriage return is depressed, the data link controller transfers the information in the display memories to the head end on a selected time slot. The data link controller is comprised of a multi-protocol chip such as type 6854 available from Motorola, Inc., an input buffer 95 and an output buffer 97. The data link controller is controlled by the microprocessor 99, using timing signals from the distribution terminal timing and synchronization circuitry.

Signals are transferred in two ways. In the direction from the head end distribution control terminal to the distribution terminal, the data link control 96 is constantly looking for information directed to the circuit in which it resides. To perform this function:

(a) the input buffer 95 clocks in the 8 bits time slot 1 at 1.544 megahertz during every frame. It then clocks in the most significant bits of this time slot at 56 kilobits per second to the input 10 of data link control 96.

(b) The data link control 96 is constantly looking for a HDLC flag character. If a flag character is detected, microprocessor 99 is informed. Data link control 96 then transfers the next 8 bits received (address bits) to microprocessor 23 of the distribution terminal 4. If these bits correspond to the local VRAM address, the microprocessor then informs the data link control 96 via microprocessor 99 to transfer to the receive mode.

(c) The next 8 bits received are control bits. They are transferred to microprocessor 99 to check them for validity. If they are invalid, the microprocessor formulates a signal sent to the head end via the HDLC signalling protocol. The head end then retransmits the message.

(d) In the receive mode the data link control 96 transfers the characters it receives 8 bits at a time directly to microprocessor 99. The microprocessor then transfers this data to the correct memory 103 location.

(e) This process continues until the data link control 96 detects a second flag. This signals that the message is complete. The 16 bits preceding the flag are error check bits. The data link control examines these error check bits and determines if a valid message is received. If so, it signals to the microprocessor 99 and returns to the idle state (looking for a flag). The microprocessor acknowledges the signal over the channel to the head end.

If the error check is incorrect, then the transmission is in error. The microprocessor 99 then fills the aforenoted digit line on the television screen with a message such as ***TRANSMISSION ERROR, signals this to the data base, and awaits the retransmission of the signal. When the retransmission is received, the new characters are displayed, and the transmission is acknowledged. The characters TRANSMISSION CORRECTED** should also be displayed in the bottom line of the video display.

For transmission from the VRAM to the DCT 11, all of the VRAMs in the entire system access time slot 1 on a contention basis, i.e., once one accesses the channel no other VRAM can transmit until this one has finished transmitting. The VRAM determines whether or not the channel is being used by looking at the received transmission to see if it is in a valid idle state. It is possible to determine the status of the upstream channel by looking at the downstream channel because whenever the upstream channel is available, an idle message is transmitted.

The actual transmission is controlled by microprocessor 99. It is constantly updated by the receive portion of the data link control 96 about whether or not the system is in an idle state. To be in a valid idle state, the receive path must have been in the idle state for more than a given number of frames. The number of frames between idle and valid idle states is a random number between 0 and 4, selected by the microprocessor. The purpose of this delay is to ensure that several VRAMs do not try to transmit at once following a long DCT to VRAM transmission.

If microprocessor 99 determines that a subscriber wishes to transmit from his keyboard, it transmits an 8 bit address character (VRAM address) to the data link control 96. Control 96 then generates an 8 bit flag frame and transmits the address character. It does this by generating a 56 kilobits per second data stream on its output pin. This output is shifted into output buffer 97 which adds a bit after every 7th bit (to form a 64 kilobits per second data stream). Eight bits of data in the output buffer is then clocked out at 1.544 megahertz during time slot 1 (8,000 times per second).

The microprocessor then follows the address character with a control character (8 bits) and then the alphanumeric characters (7 bits of ASCII and the inverted display bit) that it wishes to send. It then terminates the transmission by signalling to data link control 96 that the character sent is the last character. The control 96 then generates and transmits a 16 bit error check message, and an 8 bit flag message, and then returns to the idle state.

The microprocessor 99 accepts all of the signalling and data received by the various inputs to the VRAM, to control the operation thereof and to signal its status to microprocessor 23. It accepts inputs from 4 sources, the data link control 96, the bus 100 to microprocessor 23, the A channel bit information from microprocessor 23, and address and data bus 101 to multiplex 102.

The data link control 96 transfers status information and 8 bit data words to microprocessor 99. The microprocessor uses the status information to determine when it can transmit and when it should receive information. It accepts the data words from the data link control and uses them to determine whether the incoming data is valid and if it is directed to this VRAM. If the data is directed to the VRAM the microprocessor extracts the characters and transfers them to the correct location in the appropriate memory 103. Some of the data will be control words directed to the VRAM microprocessor. The microprocessor then takes appropriate action on these control words. Upon termination of the message, the microprocessor generates the code words to form an acknowledge packet for the data base. The data link control 96 then transmits this packet to the data base at the head end.

The microprocessor 99 receives up to 4 A channel signalling bits every frame. Previous communication with the distribution terminal microprocessor 23 will have informed it of which subscriber corresponds to which bit. The microprocessor transfers these bits into 4 separate registers, one for each VRAM, and then analyzes the information in the registers.

The information transfers over the A signalling channel from the subscriber terminal is in an asynchronous format consisting of a start bit, nine data bits and a stop bit. Therefore the microprocessor initially continuously looks for a start and when one is received, uses the next bit to determine if the input is from key pad 55, keyboard 56, etc. and then considers the next 8 bits as data bits. When 8 data bits have been received it will analyze the 8 bit words and perform one of three operations: (1) display data, (2) perform control operations, or (3) transfer data.

To display data, the microprocessor first sets the character colour and then transfers the data to the correct memory location. The colour the character will be determined in advance by the user, by pressing the "colour set" key. In one embodiment the choice was green or orange, with the default colour being green.

The correct memory location is a memory address such that the character will be displayed in the bottom character line (the talking window) of the television screen when accessed by the video display generator 104. The first character is placed in a memory location to appear on the left-hand edge of the T.V. screen. The following characters (up to 31 in number) are placed in position adjacent to the preceding character. If more than 32 characters are typed then the correct character position rolls over and starts again at the left-hand side of the T.V. screen.

If the 8 bit data word received is a control character the microprocessor looks up the character in a table and then performs the proper subroutine to perform the required function.

Typical functions of the control characters are:

(i) backspace character—the last character in the talking window will be erased.

(ii) delete character—all characters in the talking window will be erased.

(iii) escape character—this character tells the microprocessor that the next character received is control information, as opposed to data. For example a subscriber may wish to change a parameter such as background colour. He does this by pressing the escape character and following it with a character indicating the next colour requested.

It is clear that various types of control can be provided such as various numbers of colours for various sizes of grids, transmission of data to a DATA PACK node or to various network locations using dedicated channels, access to time slots other than time slot 1, interactive control with light pen, joystick or keyboard cursors, down loading of software; the programs can be available at a data base and downloaded at the VRAM memory for execution.

When the carriage return character is received microprocessor 99 generates address and control messages necessary to transmit a packet of information and send this information to the data link control 96. It then transfers the characters in the talking window to the data base by taking the 8 bits of data for each character from the corresponding memory locations and passing it on to the data link control. When the last character is transmitted the microprocessor signals this to the data link control so that it can generate the error check and flower bits. It also inverts all of the displayed characters to signal to the user that the message has been sent.

To preserve ASCII format the 7th bit, which had been used in the memory to select colour, is replaced by the correct bit that ASCII character.

The microprocessor then waits for an acknowledgement from the data base of the head end. If it is received, the transaction is complete. If no acknowledgement is received within two seconds or if the wrong sequence number is received the microprocessor retransmits the message. Up to three retransmissions is tried. If all three fail, the microprocessor displayed **TRANSMISSION LINE FAILURE** in the line above the talking window and reinverts all characters.

The subscriber retransmits the characters if he so desires by pressing the carriage return key.

The third source of signals received by the microprocessor is the source of control signals generated by microprocessor 23. These signals are received in an asynchronous mode over a serial line using the asynchronous ports in each of the microprocessors. The line is used to transmit the information from the distribution terminal controller to the VRAM that a subscriber requests service, what the subscriber address is, and what time slot the subscriber will use. When a subscriber turns off the keyboard this information is transmitted to the VRAM microprocessor 99.

In the opposite direction the VRAM signals the control microprocessor 99 the information that a video display generator is available, and upon termination of the connection the VRAM transmits the total number of acknowledge packets the subscriber has generated since he was connected.

The last set of signals transmitted to and from the VRAM microprocessor 99 is found on memory bus 101. The memory bus consists of a 12 bit address bus and an 8 bit bidirectional data bus. This bus is used by the microprocessor to place the information received from the data link control 96 to the correct place in the VRAM memory 103 to appear on the proper position on the T.V. screen. It is also used to retrieve the information stored in the memory displayed on the t.v. screen to transmit it in packet format to the data base of the head end.

The VRAM has full independent blocks of memory which consists of 512 (increasable) 8 bit bytes. These memory blocks are accessed by 2 devices, the VRAM microprocessor 99 and the video display generators 104.

The VRAM microprocessor accesses all memory blocks in parallel via the memory bus 101. There are four video display generators preferred for 12 subscriber, although the number used will depend on traffic experienced. Each of these accesses one block of memory independently of the others. The video display generators normally address and read the contents of the memory block. However a multiplex gate 102 is included so that at any time the microprocessor wishes to access the memories it can override the video display generators.

The video display generators each are large scale integrated circuits which read data from a memory and produce a composite video signal which will allow the generation of an alphanumeric or graphic display. These circuits are available from such suppliers as General Instrument of the United States. The composite video is modulated up to an unused television channel by modulator 105 and then retransferred to the VHF distribution bus 17 as described earlier.

A person understanding this description may now conceive of other embodiments, or of variations. All are considered to be within the sphere and scope of the invention as defined in the claims appended hereto.

The embodiments of the invention in which an exclusive property or privilege is claimed are defined as follows:

1. An interactive cable television control and transmission system comprising a central station, a plurality of subscriber terminals, a plurality of subscriber distribution terminals each including a plurality of separate subscriber drops each for connection to a respective one of a plurality of the subscriber terminals, and a tree-type transmission connecting said central station to each of said distribution terminals, each of said central station, said distribution terminals and said subscriber terminals including means for transmitting and receiving digital signals whereby data from each subscriber terminal can be communicated to said central station said central station also comprising a source of television signals arranged in a plurality of separate channels, and means for developing for each subscriber terminal a list of channels accessible by that terminal, each said subscriber terminal comprising a television terminal, manually operable means for designating a required one of the television channels and means for generating a digital channel request signal dependent upon said required channel, each said subscriber distribution terminal comprising a plurality of television converters each connected to a respective subscriber drop for transmitting to the respective terminal a television channel, microprocessor means arranged to repeatedly transmit to each subscriber terminal in turn a digital signal requesting said digital channel request signal, to receive from said central station and store said lists of channels accessible by the terminals and to compare said request signal with said list for each terminal, and control signal generating means for generating a control signal to control each converter whereby to supply to the respective terminal the requested accessible channel.

2. A system as defined in claim 1, wherein said converter controlling means includes a variable oscillator having input means for controlling the frequency of oscillation thereof, said microprocessor means being arranged to store information as the last channel request signal received from a subscriber terminal, to compare with the stored signal a received signal and to apply to said input means an instruction signal only as detection of a change between said received signal and said stored signal.

3. A system as defined in claim 1 in which the subscriber distribution terminal includes means for scanning each subscriber drop, and in which each said subscriber terminals includes a modem, means for applying said television request signal in digital form to the modem for application to the subscriber drop, means for connecting a television terminal to the subscriber drop for reception of the selected channel, a keyboard data signal generation terminal, and a data bus interconnecting the keyboard data signal generation terminal and the control signal generating means.

4. A system as defined in claim 3, in which the control signal generating means is adapted to generate and apply said television service request signal as a binary coded data signal in a predetermined control channel of a time division multiplex signal carried by the subscriber drop with, but at a different frequency as, the television signal.

5. A system as defined in claim 1, wherein each distribution terminal is arranged to transmit to said central station data concerning the channel request signals from said subscriber terminals.

6. A system as defined in claim 5, further including means at the subscriber distribution terminal for storing a usage signal indicative of what television channel each converter is applying to corresponding said subscriber drops, a central control system adapted to poll said subscriber distribution terminal, and means at said terminal for applying a signal to the transmission medium for transmission to the central control system corresponding to said usage signal.

7. A system as defined in claim 1 wherein said distribution terminal comprises a bus for receiving the television signal comprising a plurality of television channels, each of the converters having its input connected to the bus, and comprising a variable frequency local oscillator adapted to provide a signal having a frequency determined by the control signal, a mixer for receiving the television signal from the local oscillator and for outputting an intermediate frequency signal, a second mixer for receiving the intermediate frequency signal and a second local oscillator signal; and further including a second local oscillator adapted to output a predetermined fixed frequency signal connected to the second mixer in a plurality of said converters.

8. A system as defined in claim 7 further comprising a second plurality of converters similar to the first plurality of converters, each connected with its input and its output in parallel with one of the first plurality of converters, and further including a third local oscillator adapted to output a second predetermined frequency signal connected to the second mixer in the second plurality of said converters.

9. A system as defined in claim 7, in which each variable frequency local oscillator is comprised of a digitally controlled phase locked loop, and further including said microprocessor means being adapted to apply data signals to each said phase locked loop whereby the frequency of each variable frequency local oscillator can be controlled, modem means connecting each subscriber drop to the microprocessor means, for translating digital signals received from each said drop and applying them to the microprocessor means, whereby data signals are applied to the phase locked loop corresponding to the subscriber drop to which an associated converter is connected.

* * * * *